(12) United States Patent
Kim et al.

(10) Patent No.: US 12,394,806 B2
(45) Date of Patent: Aug. 19, 2025

(54) GASKET ASSEMBLY AND FUEL CELL HUMIDIFIER COMPRISING SAME

(71) Applicant: KOLON INDUSTRIES, INC., Seoul (KR)

(72) Inventors: Do Woo Kim, Seoul (KR); Hyoung Mo Yang, Seoul (KR); In Ho Kim, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 800 days.

(21) Appl. No.: 17/761,195

(22) PCT Filed: May 20, 2021

(86) PCT No.: PCT/KR2021/006259
§ 371 (c)(1),
(2) Date: Mar. 17, 2022

(87) PCT Pub. No.: WO2021/235853
PCT Pub. Date: Nov. 25, 2021

(65) Prior Publication Data
US 2022/0367886 A1    Nov. 17, 2022

(30) Foreign Application Priority Data
May 22, 2020   (KR) .................. 10-2020-0061426

(51) Int. Cl.
*H01M 8/0276* (2016.01)
*B01D 63/02* (2006.01)
(Continued)

(52) U.S. Cl.
CPC .......... *H01M 8/0276* (2013.01); *B01D 63/02* (2013.01); *H01M 8/04126* (2013.01);
(Continued)

(58) Field of Classification Search
None
See application file for complete search history.

(56) References Cited

U.S. PATENT DOCUMENTS 9,895,664 B2   2/2018 Kobayashi
2002/0051902 A1* 5/2002 Suenaga ............ H01M 8/0273
                                              29/623.2
(Continued)

FOREIGN PATENT DOCUMENTS

DE        3032417 A1    8/1980
JP      2005-156062 A    6/2005
(Continued)

OTHER PUBLICATIONS

CN Office Action dated Dec. 22, 2023.
JP Office Action dated Oct. 3, 2023.
Extended European Search Report dated Jul. 31, 2023.

*Primary Examiner* — Matthew W Van Oudenaren
(74) *Attorney, Agent, or Firm* — Harvest IP Law, LLP

(57) ABSTRACT

Proposed are a gasket assembly and a fuel cell humidifier comprising the same which can be manufactured with improved productivity and can drastically reduce maintenance costs thereof. The gasket assembly according to an embodiment of the present disclosure is a gasket assembly for a fuel cell humidifier comprising a mid-casing, a cap fastened to the mid-casing, and at least one cartridge disposed in the mid-casing and receiving a plurality of hollow fiber membranes. The gasket assembly includes a packing part provided with a hole into which an end part of the cartridge is inserted, an edge part formed by being connected to the packing part, and a damping part formed on an outer peripheral surface of the cartridge.

18 Claims, 16 Drawing Sheets

(51) Int. Cl.
*H01M 8/04119* (2016.01)
*H01M 8/2475* (2016.01)

(52) U.S. Cl.
CPC ..... *H01M 8/2475* (2013.01); *B01D 2313/041* (2022.08); *B01D 2313/203* (2022.08)

(56) References Cited

U.S. PATENT DOCUMENTS

| | | | | |
|---|---|---|---|---|
| 2003/0029785 | A1* | 2/2003 | Dannenmaier | B01D 63/0233 |
| | | | | 210/263 |
| 2010/0193975 | A1 | 8/2010 | Kammann | |
| 2013/0306545 | A1* | 11/2013 | Shinohara | B01D 63/021 |
| | | | | 210/321.89 |
| 2014/0291874 | A1* | 10/2014 | Kim | H01M 8/04126 |
| | | | | 261/101 |
| 2015/0188154 | A1* | 7/2015 | Jeong | C08K 5/0025 |
| | | | | 524/574 |
| 2015/0367279 | A1 | 12/2015 | Kim | |
| 2016/0079616 | A1* | 3/2016 | Lee | B01D 53/22 |
| | | | | 210/321.88 |
| 2021/0316253 | A1* | 10/2021 | Yanagibashi | B01D 63/0221 |

FOREIGN PATENT DOCUMENTS

| | | |
|---|---|---|
| JP | 2014-522556 A | 9/2014 |
| JP | 2021-508917 A | 3/2021 |
| JP | 2022-528103 A | 6/2022 |
| JP | 2022-529365 A | 6/2022 |
| JP | 2022-552509 A | 12/2022 |
| KR | 20090013304 A | 2/2009 |
| KR | 20090057773 A | 6/2009 |
| KR | 20090128005 A | 12/2009 |
| KR | 20100108092 A | 10/2010 |
| KR | 20100131631 A | 12/2010 |
| KR | 20110001022 A | 1/2011 |
| KR | 20110006122 A | 1/2011 |
| KR | 20110006128 A | 1/2011 |
| KR | 20110021217 A | 3/2011 |
| KR | 20110026696 A | 3/2011 |
| KR | 20110063366 A | 6/2011 |
| KR | 101251256 B1 | 4/2013 |
| KR | 20130034404 A | 4/2013 |
| KR | 101393558 B1 | 5/2014 |
| KR | 10-2014-0117667 A | 10/2014 |
| KR | 10-2016-0004278 A | 1/2016 |
| KR | 101697998 B1 | 1/2017 |
| KR | 20190081736 A | 7/2019 |
| KR | 20190138528 A | 12/2019 |
| WO | 2013100677 A1 | 7/2013 |
| WO | WO2020022506 * | 1/2020 |
| WO | 2020-213990 A1 | 10/2020 |
| WO | 2020-0262911 A1 | 12/2020 |

* cited by examiner

GASKET ASSEMBLY AND FUEL CELL HUMIDIFIER COMPRISING SAME

CROSS REFERENCE TO RELATED APPLICATIONS

This application is a National Stage of International Application No. PCT/KR2021/006259 filed May 20, 2021, claiming priority to Korean Patent Application No. 10-2020-0061426 filed May 22, 2020, the disclosures of which are incorporated herein by reference in its entirety.

TECHNICAL FIELD

The present disclosure relates generally to a gasket assembly and a fuel cell humidifier comprising the same. More particularly, the present disclosure relates to a gasket assembly and a fuel cell humidifier comprising the same which can be manufactured with improved productivity and can drastically reduce maintenance costs thereof

BACKGROUND ART

A fuel cell is a power generation type battery that produces electricity by combining hydrogen and oxygen. Unlike general chemical cells such as dry cells and storage batteries, the fuel cell can continuously produce electricity as long as hydrogen and oxygen are supplied thereto, and has the advantage of being twice as efficient as an internal combustion engine because there is no heat loss in the fuel cell.

In addition, the fuel cell directly converts chemical energy generated by the combination of hydrogen and oxygen into electrical energy, and thus is low in the amount of the emission of pollutants. Accordingly, the fuel cell is not only environmentally friendly, but also has the advantage of reducing concerns about resource depletion due to increased energy consumption.

Depending on the type of electrolyte used, such a fuel cell may be largely divided into a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC).

Each of these fuel cells operates on the same principle, but differs in the type of used fuel, an operating temperature, a catalyst, electrolyte, and the like. Among the fuel cells, a polymer electrolyte membrane fuel cell (PEMFC) operates at a lower temperature compared to other fuel cells and has a high output density to enable miniaturization, and thus is known to be the most promising in transport systems as well as small-scale stationary power generation equipment.

One of the most important factors in improving the performance of a polymer electrolyte membrane fuel cell (PEMFC) is to supply a predetermined amount of moisture to a polymer electrolyte membrane or proton exchange membrane (PEM) of a membrane electrode assembly (MEA) so as to maintain moisture content. This is because when the polymer electrolyte membrane dries, the power generation efficiency of the fuel cell decreases rapidly.

The method of humidifying a polymer electrolyte membrane includes 1) a bubbler humidification method in which after filling a pressure vessel with water, target gas is passed through the pressure vessel by a diffuser so as to supply moisture to the pressure vessel, 2) a direct injection method in which the amount of supplied moisture required for fuel cell reaction is calculated and the moisture is supplied directly to a gas flow pipe through a solenoid valve, and 3) a membrane humidification method in which moisture is supplied to the flowing layer of gas by using a polymer membrane.

Among the methods, the membrane humidification method of humidifying a polymer electrolyte membrane by providing water vapor to air supplied to the polymer electrolyte membrane by using a membrane which only water vapor contained in off-gas selectively penetrates is advantageous in that the membrane humidification method can reduce the weight and size of a humidifier.

The selective penetration membrane used in the membrane humidification method is preferably a hollow fiber membrane having a large penetration area per unit volume when forming a module. That is, when a humidifier is manufactured by using the hollow fiber membrane, the hollow fiber membrane with a large contact surface area can be highly integrated and thus can sufficiently perform the humidification of the fuel cell with a small capacity, and can use low-cost materials, and can recover moisture and heat contained in off-gas discharged at high temperature from the fuel cell to be reused through the humidifier.

FIG. 1 is an exploded perspective view illustrating a fuel cell humidifier according to a conventional technology. As illustrated in FIG. 1, the fuel cell humidifier of the conventional technology includes a humidification module 110 in which moisture exchange between air supplied from the outside and off-gas discharged from a fuel cell stack (not shown) occurs, and caps 120 coupled respectively to the opposite ends of the humidification module 110.

One of the caps 120 supplies air supplied from the outside to the humidification module 110, and the remaining cap of the caps 120 supplies air humidified by the humidification module 110 to the fuel cell stack.

The humidification module 110 includes a mid-casing 111 having an off-gas inlet 111a and an off-gas outlet 111b, and multiple hollow fiber membranes 112 located inside the mid-casing 111. The opposite ends of the bundle of the hollow fiber membranes 112 are fastened to a porting part 113. The porting part 113 is generally formed by curing a liquid polymer such as a liquid polyurethane resin through a casting method.

Air supplied from the outside flows through the openings of the hollow fiber membranes 112. Off-gas introduced through the off-gas inlet 111a into the mid-casing 111 contacts with the outer surfaces of the hollow fiber membranes 112 and then is discharged from the mid-casing 111 through the off-gas outlet 111b. When the off-gas contacts with the outer surfaces of the hollow fiber membranes 112, moisture contained in the off-gas penetrates the hollow fiber membranes 112 and humidifies air flowing through the openings of the hollow fiber membranes 112.

The inner spaces of the caps 120 are in fluid communication only with the openings of the hollow fiber membranes 112 and are required to be completely blocked from the inner space of the mid-casing 111. Otherwise, air leakage due to pressure difference between the caps and mid-casing occurs, reducing the amount of humidified air supplied to the fuel cell stack and lowering the power generation efficiency of the fuel cell.

Generally, as illustrated in FIG. 1, the porting part 113 to which each of the ends of the multiple hollow fiber membranes 112 is fastened and a resin layer 114 between the porting part 113 and the mid-casing 111 block the inner spaces of the caps 120 from the inner space of the mid-casing 111. Like the porting part 113, the resin layer 114 is formed by curing a liquid polymer such as a liquid polyurethane resin usually through a casting method.

However, a casting process for forming the resin layer 114 requires a relatively large process time and thus reduces the productivity of the humidifier 100.

In addition, the resin layer 114 is adhered to the porting part 113 and the inner wall of the mid-casing 111, and accordingly, when a problem occurs in the hollow fiber membrane 112, the entirety of the humidification module 110 is required to be replaced, resulting in huge maintenance costs.

Furthermore, the repetitive operation of the fuel cell is highly likely to cause a gap between the resin layer 114 and the mid-casing 111. That is, as the fuel cell is repeatedly operated and stopped, the resin layer 114 expands and contracts alternately. Accordingly, due to difference in thermal expansion coefficients between the mid-casing 111 and the resin layer 114, it is highly probable that the resin layer 114 will be separated from the mid-casing 111. As described above, when a gap is caused between the resin layer 114 and the mid-casing 111, air leakage due to pressure difference therebetween occurs, reducing the amount of humidified air supplied to the fuel cell stack and lowering the power generation efficiency of the fuel cell.

In order to prevent air leakage due to the occurrence of a gap between the resin layer 114 and the mid-casing 111, it may be considered to perform an additional process such as applying a sealant therebetween and/or mounting a gasket assembly on a periphery thereof. However, since this additional process requires additional process time, the productivity of the humidifier 100 is reduced.

In addition, due to the repetitive operation of the fuel cell, disturbance such as vibration and shock is applied to the multiple hollow fiber membranes 112. Such disturbance causes a gap between the resin layer 114 and the mid-casing 111, and a gap between the resin layer 114 and the porting part 113. Accordingly, air leakage due to pressure difference therebetween occurs, reducing the amount of humidified air supplied to the fuel cell stack and lowering the power generation efficiency of the fuel cell.

DISCLOSURE

Technical Problem

The present disclosure is intended to propose a gasket assembly and a fuel cell humidifier comprising the same which can prevent problems due to the limitations and disadvantages of the above related technology, be manufactured with improved productivity, and drastically reduce maintenance costs thereof In addition to the aspects of the present disclosure mentioned above, other features and advantages of the present disclosure may be described below or be clearly understood by those skilled in the art to which the present disclosure belongs from such description.

Technical Solution

A gasket assembly according to an embodiment of the present disclosure is a gasket assembly for a fuel cell humidifier including a mid-casing, a cap fastened to the mid-casing, and at least one cartridge disposed in the mid-casing and receiving a plurality of hollow fiber membranes. The gasket assembly includes: a packing part provided with a hole into which an end part of the cartridge is inserted, the packing part being in close contact with the end part of the cartridge inserted into the hole so as to absorb horizontal vibration of the cartridge; an edge part formed by being connected to the packing part, the edge part being inserted into a groove formed in an end part of the mid-casing and into space defined by an end part of the cap; and a damping part formed on an outer peripheral surface of the cartridge, the damping part being restrained from moving in a vertical direction by the packing part so as to absorb vertical vibration of the cartridge.

In the gasket assembly according to an embodiment of the present disclosure, the packing part may include a body member having the hole into which the end part of the cartridge is inserted, and a protruding member formed on an end of the body member and configured to be in close contact with the end part of the cartridge inserted into the hole.

In the gasket assembly according to an embodiment of the present disclosure, the cartridge may include an inner casing having an opening formed in an end part thereof and receiving the plurality of hollow fiber membranes, and a porting part to which end parts of the plurality of hollow fiber membranes are fastened, the porting part being configured to close the opening of the inner casing.

In the gasket assembly according to an embodiment of the present disclosure, at least a portion of the porting part may be located outside the inner casing, and the protruding member may press the porting part to be in close contact with the porting part.

In the gasket assembly according to an embodiment of the present disclosure, an entirety of the porting part may be located inside the inner casing, and the protruding member may press the inner casing to be in close contact with the inner casing.

The gasket assembly according to an embodiment of the present disclosure may further include a sealing part configured to allow the cartridge to be in contact with the packing part, wherein the horizontal and vertical vibrations of the cartridge may be absorbed due to adhesive force of the sealing part.

The gasket assembly according to an embodiment of the present disclosure may further include: a damping cap part formed on at least a portion of an upper surface of the packing part and on at least a portion of an upper surface of the cartridge, the camping cap part being configured to absorb the vertical vibration of the cartridge.

In the gasket assembly according to an embodiment of the present disclosure, the packing part may be provided with at least two holes into which at least two cartridges are respectively capable of being inserted, and the damping part may be formed on an outer peripheral surface of each of the at least two cartridges and may be restrained from moving in the vertical direction by the packing part so as to absorb vertical vibration of the cartridge.

In the gasket assembly according to an embodiment of the present disclosure, the edge part may be provided with an edge wing protruding in each of opposite directions thereof, wherein the edge wing may be inserted into the groove formed in the end part of the mid-casing while filling the groove, so the inside and outside of the mid-casing may be blocked from each other, and the mid-casing and the cap may be sealed.

In the gasket assembly according to an embodiment of the present disclosure, each of the packing part and the edge part may have a first hardness of 20 to 70 Shore A, and may further include a reinforcing member formed by being inserted into at least a portion of each of the packing part and the edge part, the reinforcing member having a second hardness higher than the first hardness.

The fuel cell humidifier according to an embodiment of the present disclosure includes: the mid-casing; the cap fastened to the mid-casing; the at least one cartridge disposed in the mid-casing and receiving the plurality of hollow fiber membranes; and the gasket assembly coupled securely to at least an end of a humidification module through mechanical assembly such that the cap is in fluid communication only with the hollow fiber membranes, the gasket assembly being configured to absorb vibration of the cartridge. The gasket assembly includes: the packing part provided with the hole into which an end part of the cartridge is inserted, the packing part being in close contact with the end part of the cartridge inserted into the hole so as to absorb the horizontal vibration of the cartridge; the edge part formed by being connected to the packing part, the edge part being inserted into the groove formed in an end part of the mid-casing and into space defined by an end part of the cap; and the damping part formed on the outer peripheral surface of the cartridge, the damping part being restrained from moving in a vertical direction by the packing part so as to absorb the vertical vibration of the cartridge.

In the fuel cell humidifier according to an embodiment of the present disclosure, the packing part may include the body member having the hole into which the end part of the cartridge is inserted, and the protruding member formed on the end of the body member and configured to be in close contact with the end part of the cartridge inserted into the hole.

In the fuel cell humidifier according to an embodiment of the present disclosure, the cartridge may include the inner casing having an opening formed in an end part thereof and receiving the plurality of hollow fiber membranes, and the porting part to which end parts of the plurality of hollow fiber membranes are fastened, the porting part being configured to close the opening of the inner casing.

In the fuel cell humidifier according to an embodiment of the present disclosure, at least a portion of the porting part may be located outside the inner casing, and the protruding member may press the porting part to be in close contact with the porting part.

In the fuel cell humidifier according to an embodiment of the present disclosure, the entirety of the porting part may be located inside the inner casing, and the protruding member may press the inner casing to be in close contact with the inner casing.

The fuel cell humidifier according to an embodiment of the present disclosure may further include: the sealing part configured to allow the cartridge to be in contact with the packing part, wherein the horizontal and vertical vibrations of the cartridge may be absorbed due to adhesive force of the sealing part.

The fuel cell humidifier according to an embodiment of the present disclosure may further include: the damping cap part formed on at least the portion of an upper surface of the packing part and on at least a portion of an upper surface of the cartridge, the camping cap part being configured to absorb the vertical vibration of the cartridge.

In the fuel cell humidifier according to an embodiment of the present disclosure, the packing part may be provided with at least two holes into which at least two cartridges are respectively capable of being inserted, and the damping part may be formed on the outer peripheral surface of each of the at least two cartridges and may be restrained from moving in the vertical direction by the packing part so as to absorb the vertical vibration of the cartridge.

In the fuel cell humidifier according to an embodiment of the present disclosure, the edge part may be provided with the edge wing protruding in each of opposite directions thereof, wherein the edge wing may be inserted into the groove formed in the end part of the mid-casing while filling the groove, so the inside and outside of the mid-casing may be blocked from each other, and the mid-casing and the cap may be sealed.

In the fuel cell humidifier according to an embodiment of the present disclosure, each of the packing part and the edge part may have the first hardness of 20 to 70 Shore A, and may further include the reinforcing member formed by being inserted into at least the portion of each of the packing part and the edge part, the reinforcing member having the second hardness higher than the first hardness.

Advantageous Effects

According to the present disclosure, though the mechanical assembly of the gasket assembly, air leakage between the mid-casing and the cap is prevented, and thus the casting process of the conventional technology (that is, a process of injecting a liquid polymer into a mold and curing the liquid polymer) and an additional sealing process (that is, a process of applying and curing a sealant) may be omitted. Accordingly, according to the present disclosure, air leakage between the mid-casing and the cap is prevented and the production process time of the fuel cell humidifier can be reduced, so the productivity of the fuel cell humidifier can be drastically improved.

In addition, the gasket assembly of the present disclosure for preventing air leakage between the mid-casing and the cap is mounted to the humidification module through mechanical assembly, and accordingly, when a problem occurs in a specific part of the humidification module, it is possible to repair or replace only the associated part after mechanically and simply detaching the gasket assembly from the humidification module. Accordingly, according to the present disclosure, the maintenance costs of the fuel cell humidifier can be significantly reduced.

In addition, disturbance such as vibration occurring due to the repetitive operation of a fuel cell is reduced to prevent air leakage due to pressure difference between the mid-casing and the cap, so the power generation efficiency of the fuel cell can be improved.

MODE FOR INVENTION

The present disclosure may be variously changed and may have various embodiments, but specific embodiments will be illustrated and described in detail in the present disclosure. However, this is not intended to limit the present disclosure to the specific embodiments, and the specific embodiments should be understood to include all conversions, equivalents or substitutes included in the spirit and technical scope of the present disclosure.

Terms used in the present disclosure are only used to describe the specific embodiments, and are not intended to limit the present disclosure. The singular expression of each of the terms includes the plural expression thereof unless clearly stated otherwise in the context. In the present disclosure, terms such as "include" or "have" are intended to designate that a feature, number, step, operation, component, part, or combination thereof described in the specification exists, and should be understood not to preclude the possibility of the existence or addition of one or more other features or numbers, steps, operations, components, parts, or combinations thereof. Hereinafter, a gasket assembly and a fuel cell humidifier comprising the same according to the embodiments of the present disclosure will be described with reference to the accompanying drawings.

Figure 1:
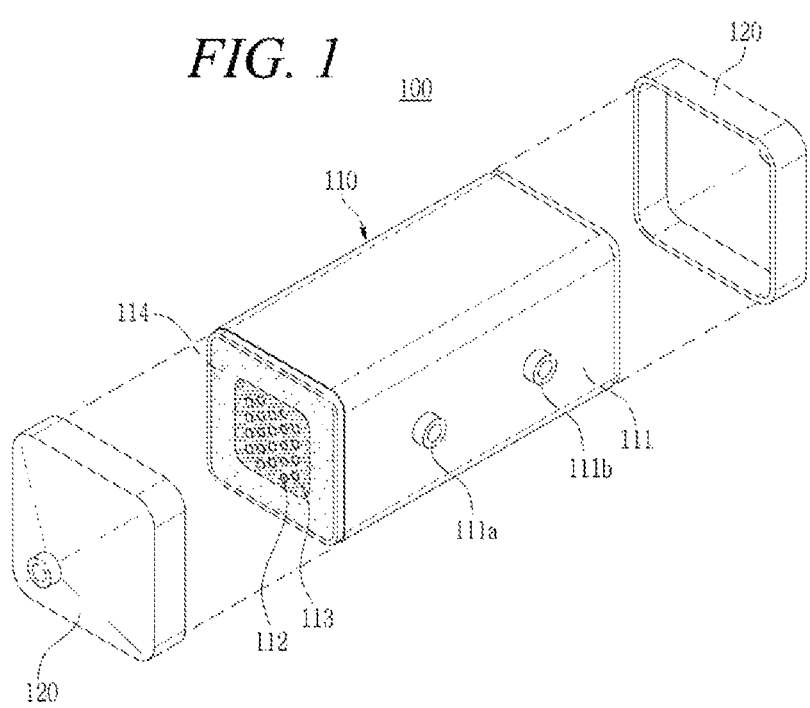
FIG. 1 is an exploded perspective view illustrating a fuel cell humidifier according to a conventional technology.
Figure 2:
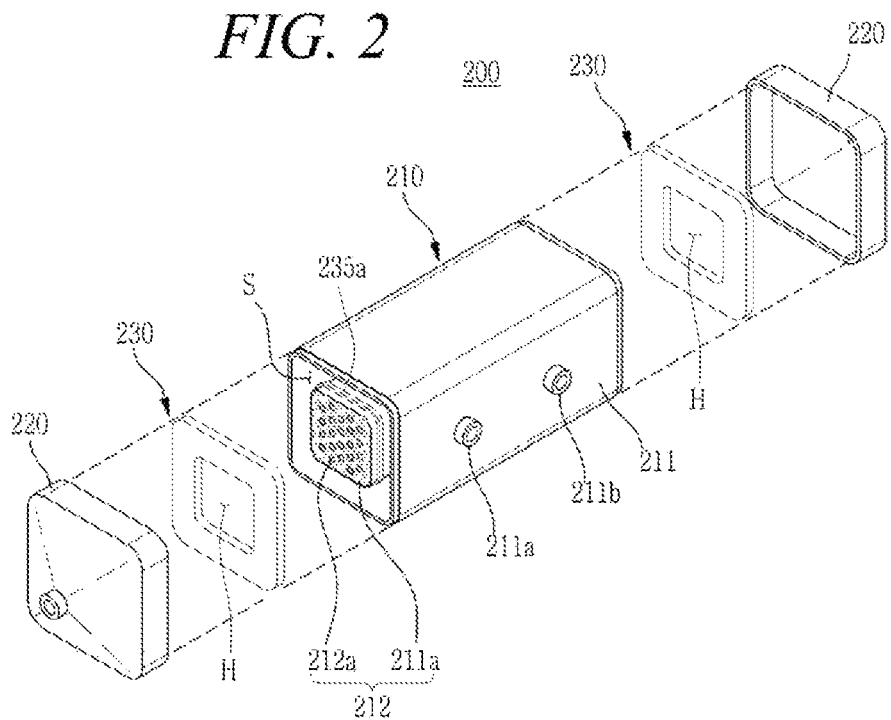
FIG. 2 is an exploded perspective view illustrating a fuel cell humidifier comprising a gasket assembly according to a first embodiment of the present disclosure.
Figure 3:
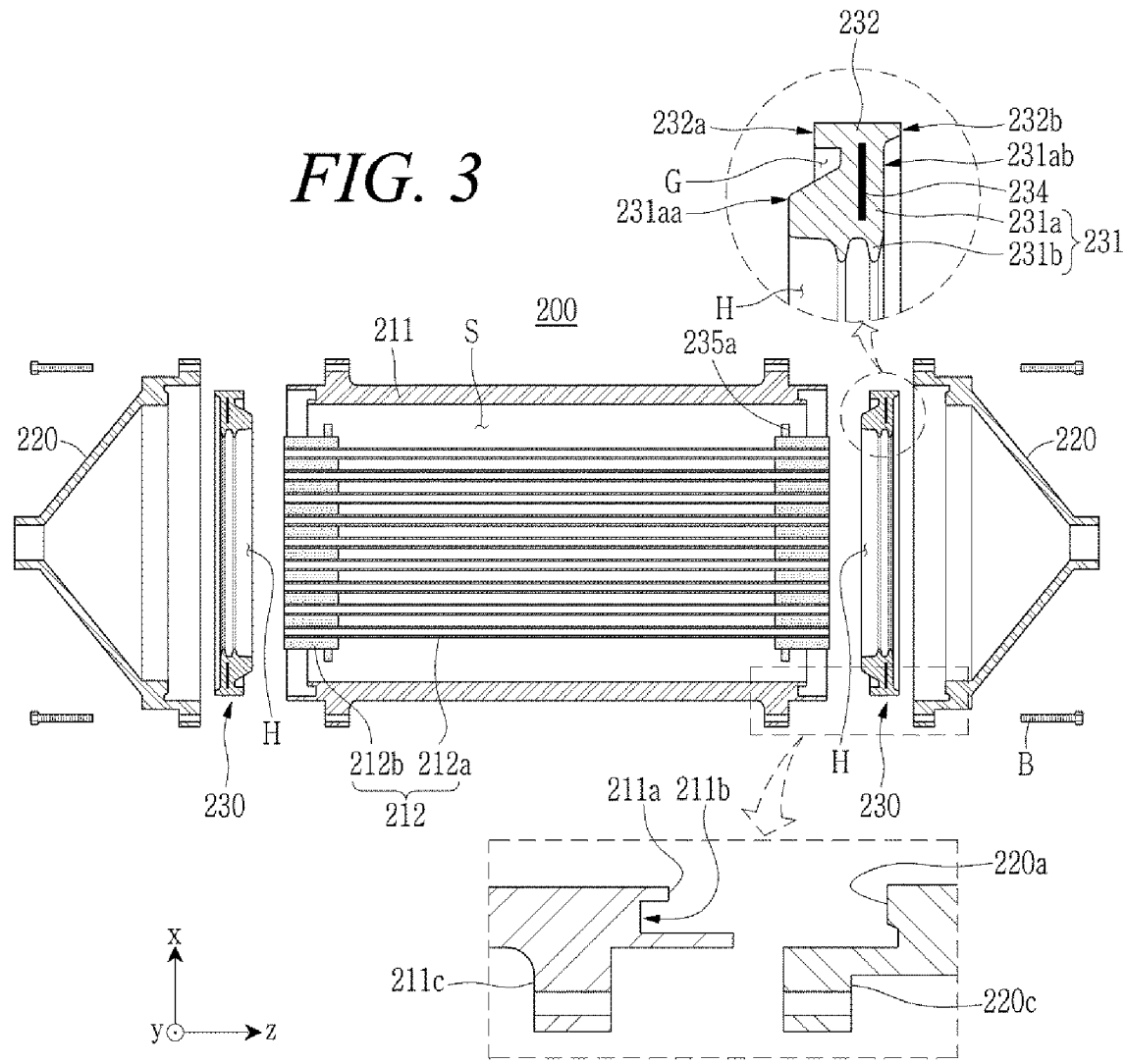
FIG. 3 is an exploded cross-sectional view illustrating the fuel cell humidifier comprising the gasket assembly according to the first embodiment of the present disclosure.
Figure 4:
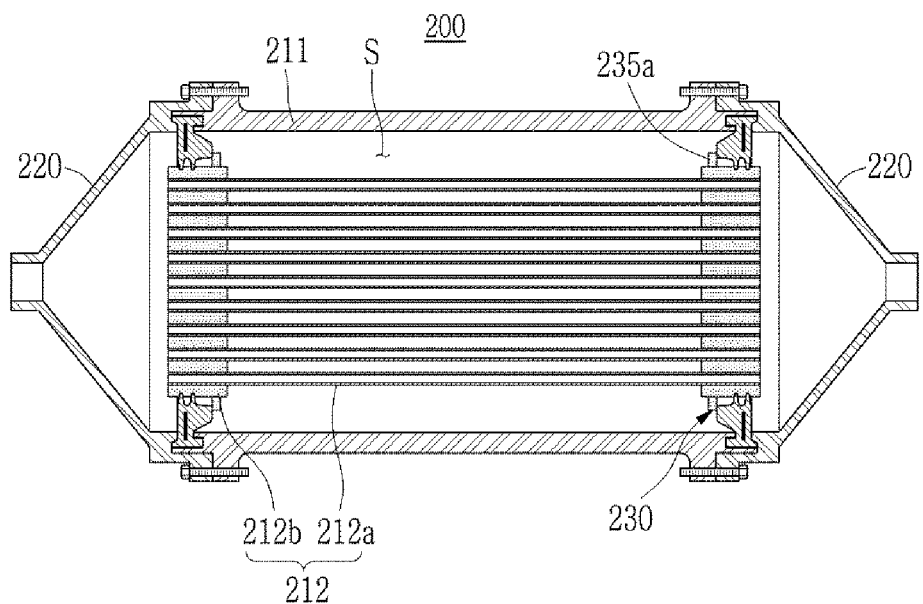
FIG. 4 is a cross-sectional view illustrating the fuel cell humidifier comprising the gasket assembly according to the first embodiment of the present disclosure.

FIG. 2 is an exploded perspective view illustrating a fuel cell humidifier comprising a gasket assembly according to a first embodiment of the present disclosure, FIG. 3 is an exploded cross-sectional view illustrating the fuel cell humidifier comprising the gasket assembly according to the first embodiment of the present disclosure, and FIG. 4 is a cross-sectional view illustrating the fuel cell humidifier comprising the gasket assembly according to the first embodiment of the present disclosure.

Referring to FIG. 2, the fuel cell humidifier 200 according to the first embodiment of the present disclosure includes a humidification module 210 which humidifies air supplied from the outside by moisture present in off-gas discharged from a fuel cell stack. The opposite ends of the humidification module 210 are coupled to caps 220, respectively.

One of the caps 220 supplies air supplied from the outside to the humidification module 210, and a remaining one of the caps 220 supplies air humidified by the humidification module 210 to the fuel cell stack.

The humidification module 210 is a device in which moisture exchange between air supplied from the outside and the off-gas occurs, and may include a mid-casing 211 having an off-gas inlet 211a and an off-gas outlet 211b, and at least one cartridge 212 disposed inside the mid-casing 211.

Each of the mid-casing 211 and the cap 220 may independently be formed of a rigid plastic or metal, and may have a cross-section having a circular or polygonal shape in a width direction. The circular shape includes an oval shape, and the polygonal shape includes a polygon having a rounded corner. For example, a rigid plastic may be polycarbonate, polyamide (PA), polyphthalamide (PPA), polypropylene (PP), or the like.

The cartridge 212 may include multiple hollow fiber membranes 212a and a porting part 212b fastening the multiple hollow fiber membranes 212a thereto. For example, the ends of the hollow fiber membranes 212a may be fastened to the porting part 212b.

The hollow fiber membranes 212a may include polysulfone resin, polyethersulfone resin, sulfonated polysulfone resin, polyvinylidene fluoride (PVDF) resin, polyacrylonitrile (PAN) resin, polyimide resin, polyamideimide resin, polyesterimide resin, or a polymer film formed of a compound of at least two thereof, and the porting part 212b may be formed by curing a liquid resin such as a liquid polyurethane resin through a casting method such as dip potting or centrifugal potting.

Air supplied from the outside flows through the openings of the hollow fiber membranes 212a. Off-gas introduced through the off-gas inlet 211a into the mid-casing 211 contacts with the outer surfaces of the hollow fiber membranes 212a and then is discharged from the mid-casing 211 through the off-gas outlet 211b. When the off-gas contacts with the outer surfaces of the hollow fiber membranes 212a, moisture contained in off-gas penetrates the hollow fiber membranes 212a and humidifies air flowing through the openings of the hollow fiber membranes 212a.

The cap 220 is in fluid communication only with the openings of the hollow fiber membranes 212a, and is required to be completely blocked from the inner space S of the mid-casing 211. Otherwise, air leakage due to pressure difference between the cap and the mid-casing occurs, reducing the amount of humidified air supplied to the fuel cell stack and lowering the power generation efficiency of a fuel cell.

In addition, due to the repetitive operation of the fuel cell, disturbance such as vibration and impact is applied to the cartridge 212 in which the multiple hollow fiber membranes 212a are received, and such disturbance causes a gap between the cartridge 212 and the mid-casing 211, and accordingly, air leakage due to pressure difference therebetween occurs, reducing the amount of humidified air supplied to the fuel cell stack and lowering the power generation efficiency of the fuel cell.

In order to solve these problems, the fuel cell humidifier 200 of the present disclosure further includes the gasket assembly 230 coupled securely to each of the opposite ends of the humidification module 210 through mechanical assembly.

According to the present disclosure, through the mechanical assembly of the gasket assembly 230, air leakage between the mid-casing 211 and the cap 220 is prevented, and thus a casting process of the conventional technology (that is, the process of injecting a liquid resin into a mold and curing the liquid resin) and an additional sealing process (that is, the process of applying and curing a sealant) may be omitted. Accordingly, according to the present disclosure, air leakage between the mid-casing 211 and the cap 220 is prevented and the production process time of the fuel cell humidifier 200 is reduced, so the productivity of the fuel cell humidifier can be drastically improved.

Furthermore, the gasket assembly 230 of the present disclosure for preventing air leakage between the mid-casing 211 and the cap 220 is mounted to the humidification module 210 through mechanical assembly, and accordingly, when a problem occurs in a specific part of the humidification module 210 (e.g., the cartridge 212), it is possible to repair or replace only the associated part after mechanically and simply detaching the gasket assembly 230 from the humidification module 210. Accordingly, according to the present disclosure, the maintenance costs of the fuel cell humidifier 200 can be significantly reduced.

In addition, disturbance such as vibration occurring due to the repetitive operation of a fuel cell is reduced to prevent air leakage due to pressure difference between the mid-casing 211 and the cap 220, so the power generation efficiency of the fuel cell can be improved.

Referring to FIGS. 3 and 4, the gasket assembly 230 according to the first embodiment of the present disclosure includes a packing part 231, an edge part 232, and a damping part 235a. The packing part 231 and the edge part 232 may be formed of an elastic material (for example, silicone and rubber, etc.) having a first hardness of 20 to 70 Shore A, preferably, a first hardness of 30 to 60 Shore A.

The packing part 231 is provided with a hole H into which the end part of the cartridge 212 (for example, the porting part 212b) is inserted, and is interposed between the mid-casing 211 and the cartridge 212. The packing part 231 includes a body member 231a and a protruding member 231b.

The body member 231a is provided with the hole H into which the end part of the cartridge 212 is inserted, wherein the hole H is formed to have a shape corresponding to the shape of the end part of the cartridge 212. A lower body member 231aa formed by protruding from the body member 231a toward the mid-casing 211 may be formed to have a polygonal shape (for example, a trapezoidal shape) in a cross section, and an upper body member 231ab formed to face the cap 220 may be formed to have a planar shape. Space in which a sealing part 233 to be described later is disposed may be defined between the lower body member 231aa and the porting part 212b of the cartridge. Furthermore, a groove G into which the end part 211aa of the mid-casing 211 is fitted is defined between the lower body member 231aa and the edge part 232.

The protruding member 231b is formed on a first end of the body member 231a so as to be in contact with the porting part 212b of the cartridge inserted into the hole H. The protruding member 231b may be at least one annular protrusion protruding from the first end of the body member 231a. The protruding member 231b can press the porting part 212b of the cartridge by elastic force to be in close contact therewith, and thus can seal the space of the mid-casing 211 and the space of the cap 220. Accordingly, the protruding member 231b can prevent a fluid present in the mid-casing 211 from flowing to the space defined in the cap 220. In addition, since the protruding member 231b has elasticity, the protruding member 231b can absorb the vibration of the cartridge 212 in a horizontal direction (x and y-axis directions in FIG. 3), and thus disturbance due to the vibration of the cartridge can be reduced such that air leakage due to pressure difference between the mid-casing 211 and the cap 220 can be prevented.

The edge part 232 is formed on the second end of the body member 231a. The edge part 232 may be inserted into a groove 211bb formed in the end part of the mid-casing and into space defined by the end part 220a of the cap. The edge part 232 may be provided with edge wings 232a and 232b protruding in opposite directions. Each of the edge wings 232a and 232b may be configured in the longitudinal direction of the humidification module 210. During the assembly of the mid-casing with the cap, the edge wing 232a is inserted into the groove 211bb of the end part of the mid-casing, and the end part 220a of the cap presses the edge wing 232b, and then the mid-casing and the cap are fastened to each other by a fastening means such as a bolt B to be assembled with each other. In this case, the edge wings 232a and 232b are made of materials having elasticity, and thus the edge wing 232a may be inserted into the groove 211bb of the end part of the mid-casing while filling a predetermined portion thereof. Fastening pieces 211cc and 220c having fastening holes formed respectively therein for bolting may be formed on the side surfaces of the end parts of the mid-casing 211 and the cap 220, respectively. The edge wings 232a seals the groove 211bb of the end part of the mid-casing, and thus the inside and outside of the mid-casing 211 can be blocked from each other, and the mid-casing 211 and the cap 220 can be sealed.

The damping part 235a may be formed on the outer peripheral surface of the porting part 212b of the cartridge by protruding therefrom in a radial direction. After forming the porting part 212b of the cartridge, the damping part 235a may be formed to have the shape of an annular ring on the outer surface of the porting part 212b of the cartridge. The damping part 235a may be configured such that at least a portion of the damping part 235a is in contact with the lower surface of the packing part 231. Specifically, the damping part 235a may be configured such that at least a portion of the damping part 235a is in contact with the lower surface of the lower body member 231aa. Such a damping part 235a is restrained from moving in a vertical direction (a z-axis direction in FIG. 3) by the packing part 231 and can absorb the vertical vibration of the cartridge 212. Accordingly, disturbance due to the vibration of the cartridge can be reduced.

That is, the packing part 231 absorbs the horizontal vibration of the cartridge 212, and the damping part 235a absorbs the vertical vibration of the cartridge 212 so as to reduce disturbance due to vibration of the cartridge, so air leakage due to pressure difference between the mid-casing 211 and the cap 220 can be prevented.

In addition, the gasket assembly 230 may further include a reinforcing member 234. The reinforcing member 234 may have a second hardness higher than the first hardness. For example, the reinforcing member 234 may be formed of a metal, or a thermoplastic or thermosetting resin, or the like. The reinforcing member 234 may be manufactured after inserting a metal plate into a mold when forming the gasket assembly 230 such that the reinforcing member 234 is formed by being inserted into the gasket assembly 230. The reinforcing member 234 may be inserted into and formed in each of at least a portion of the packing part 231 and at least a portion of the edge part 232. The reinforcing member 234 may be formed in a portion vulnerable to deformation (a portion in which the groove G is formed) in the gasket assembly 230. The reinforcing member 234 which has higher hardness than the packing part 231 and the edge part 232 prevents the body member 231a from being deformed when the gasket assembly 230 is mechanically assembled with the humidification module 210 or during operation of the humidifier, and thus can more securely prevent air leakage between the mid-casing and the cap.

Figure 5:
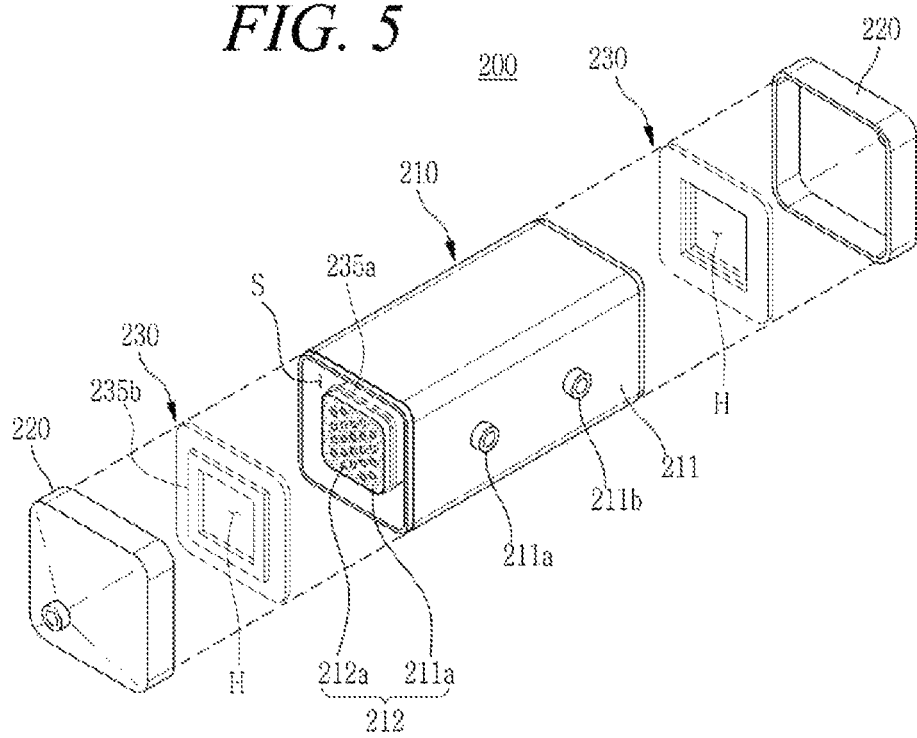
FIG. 5 is an exploded perspective view illustrating the fuel cell humidifier comprising the gasket assembly according to a second embodiment of the present disclosure.

Next, a fuel cell humidifier comprising the gasket assembly according to a second embodiment of the present disclosure will be described with reference to FIGS. 5 to 7. FIG. 5 is an exploded perspective view illustrating the fuel cell humidifier comprising the gasket assembly according to the second embodiment of the present disclosure, FIG. 6 is an exploded cross-sectional view illustrating the fuel cell humidifier comprising the gasket assembly according to the second embodiment of the present disclosure, and FIG. 7 is a cross-sectional view illustrating the fuel cell humidifier comprising the gasket assembly according to the second embodiment of the present disclosure.

Figure 6:
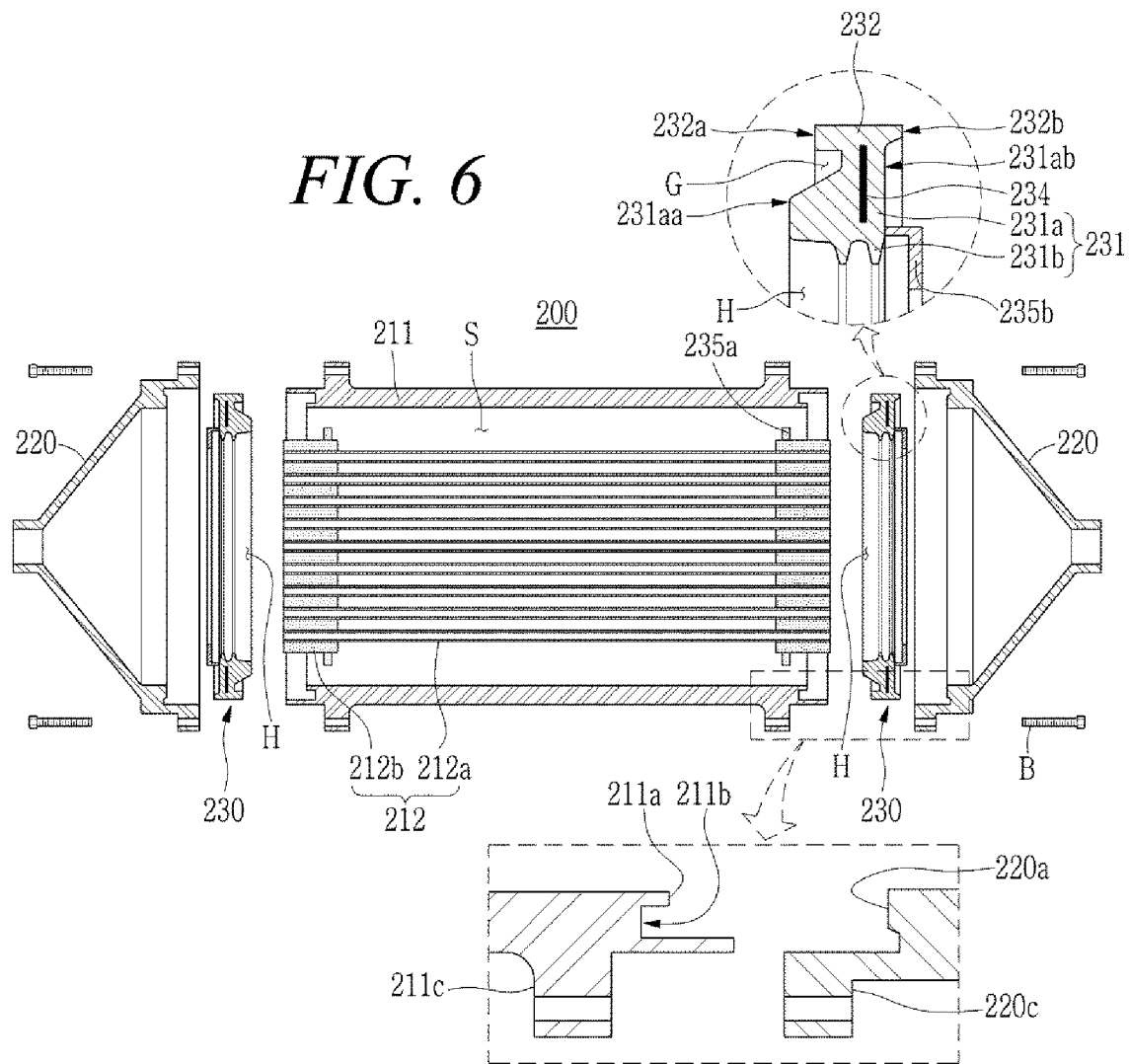
FIG. 6 is an exploded cross-sectional view illustrating the fuel cell humidifier comprising the gasket assembly according to the second embodiment of the present disclosure.
Figure 7:
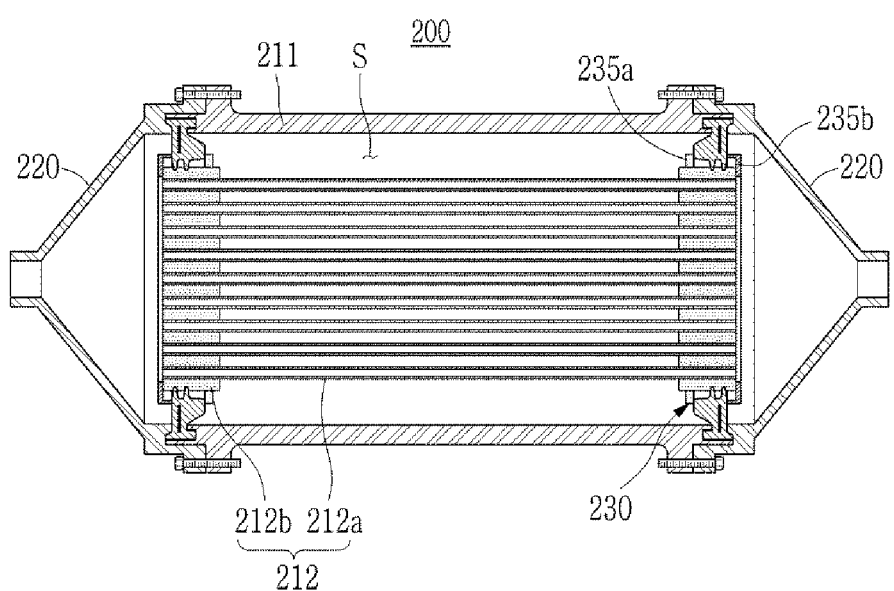
FIG. 7 is a cross-sectional view illustrating the fuel cell humidifier comprising the gasket assembly according to the second embodiment of the present disclosure.

Referring to FIGS. 5 to 7, the gasket assembly according to the second embodiment of the present disclosure includes the packing part 231, the edge part 232, and the damping part 235a like the gasket assembly according to the first embodiment described above, and further includes a damping cap part 235b. The packing part 231, the edge part 232, and the damping part 235a are substantially the same as the associated parts of the gasket assembly according to the first embodiment described above, and thus a repeated description thereof will be omitted.

As illustrated in FIGS. 5 to 7, the damping cap part 235b may be formed on at least a portion of the upper surface of the packing part 231 and on at least a portion of the upper surface of the porting part 212b of the cartridge 212.

The damping cap part 235b may be configured to be in contact with or spaced apart by a predetermined distance from the outer peripheral surface of the porting part 212b, and may be configured to be in contact with the upper surface of the porting part 212b. The damping cap part 235b may be integrally formed to have a ring shape as a whole, or to have a ring shape as a whole by spacing a plurality of "L" shapes apart by predetermined distances from each other.

Such a damping cap part 235b, together with the damping part 235a, can absorb the vertical vibration of the cartridge 212.

Figure 8:
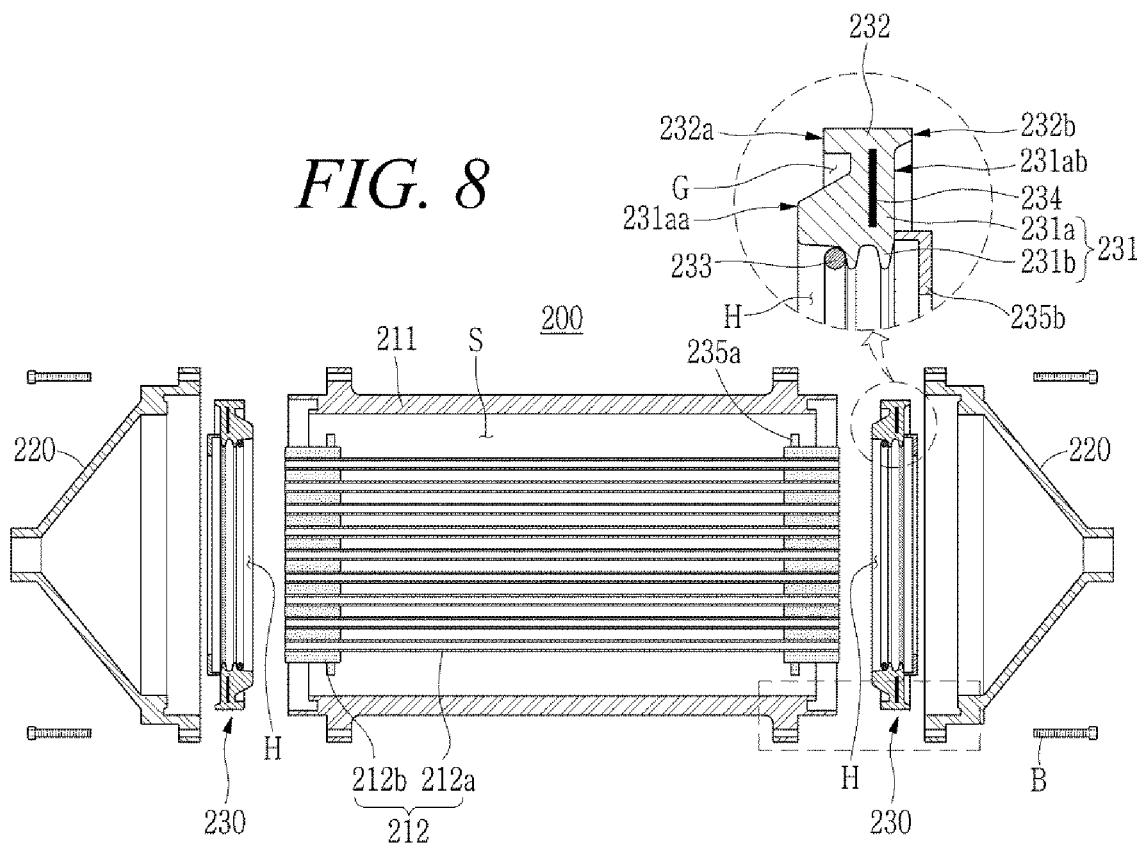
FIG. 8 is an exploded cross-sectional view illustrating the fuel cell humidifier comprising the gasket assembly according to a third embodiment of the present disclosure.

Next, a fuel cell humidifier comprising the gasket assembly according to a third embodiment of the present disclosure will be described with reference to FIGS. 8 and 9. FIG. 8 is an exploded cross-sectional view illustrating the fuel cell humidifier comprising the gasket assembly according to the third embodiment of the present disclosure, and FIGS. 9A and 9B are cross-sectional views illustrating modified examples of the gasket assembly according to the third embodiment of the present disclosure.

Referring to FIG. 8, the gasket assembly according to the third embodiment of the present disclosure includes the packing part 231, the edge part 232, the sealing part 233, and the damping part 235a, and may further include the damping cap part 235b. The packing part 231, the edge part 232, the damping part 235a, and the damping cap part 235b are substantially the same as the associated parts of the gasket assembly according to the first and second embodiments described above, and thus repeated description thereof will be omitted.

The sealing part 233 may include at least one of a solid sealing material and a liquid sealing material. The solid sealing material may be made of a material such as silicone, acrylic rubber, EPDM, or NBR, and the liquid sealing material may be made of a material such as silicone or urethane.

The sealing part 233 is located between the cartridge 212 and the packing part 231 and is configured to allow the cartridge 212 to be in contact with the packing part 231. Specifically, the sealing part 233 is configured to be in contact simultaneously with (to adhere to) the porting part 212b of the cartridge and the lower body member 231aa of the packing part. The sealing part 233 seals the space of the mid-casing 211 and the space of the cap 220 and prevents a fluid in the mid-casing 211 from flowing to the cap 220.

In addition, the sealing part 233 is configured to be in contact simultaneously with the cartridge 212 and the packing part 231, and thus the horizontal and vertical vibrations of the cartridge 212 can be additionally absorbed due to the adhesive force of the sealing part 233, so the horizontal and vertical vibrations of the cartridge 212 can be effectively reduced.

Figure 9A:
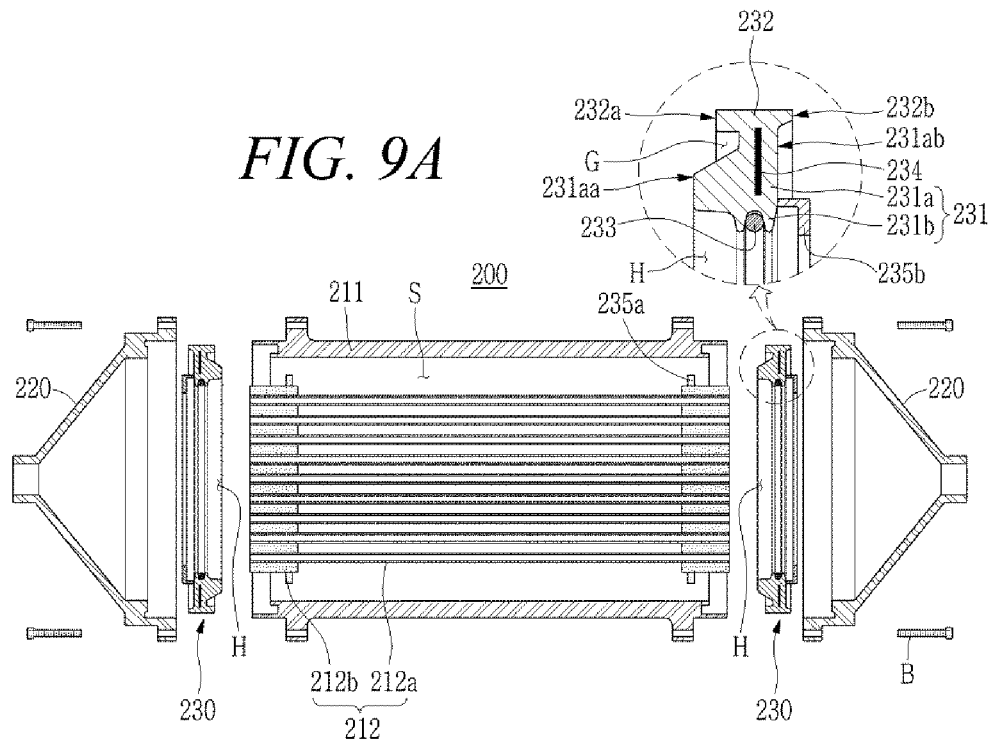
FIGS. 9A and 9B are cross-sectional views illustrating modified examples of the gasket assembly according to the third embodiment of the present disclosure.
Figure 9B:
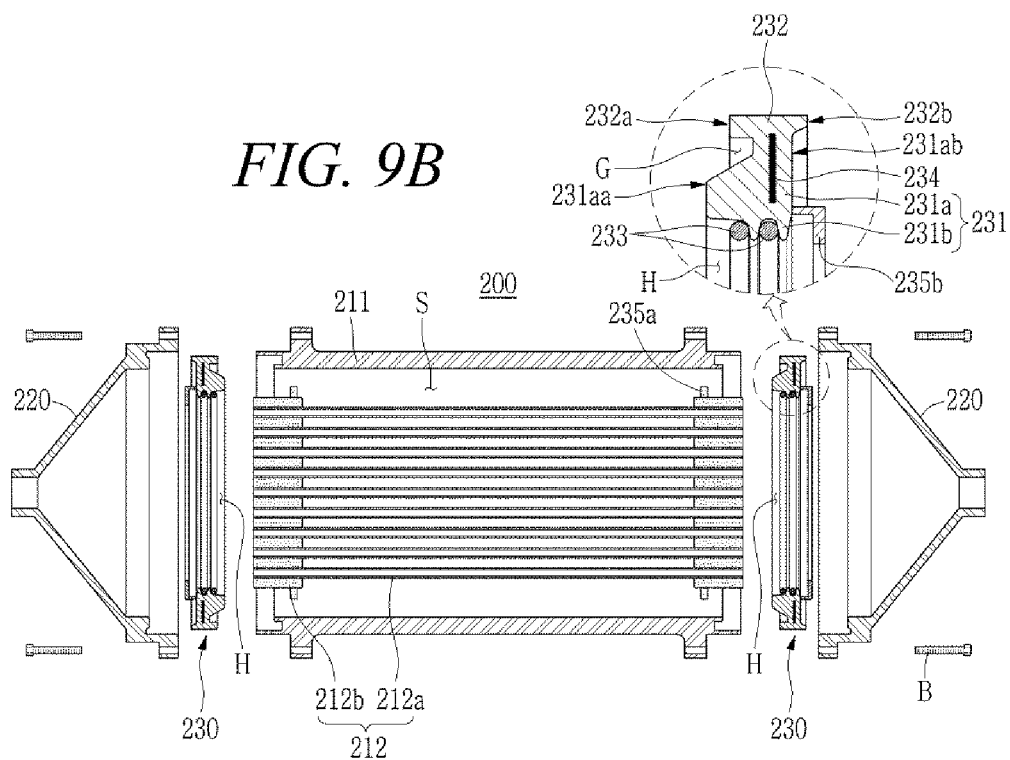

FIG. 9A illustrates that the sealing part 233 is configured to be in contact simultaneously with the porting part 212b of the cartridge and the protruding member 231b of the packing part, and FIG. 9B illustrates that the sealing part 233 is configured to be in contact simultaneously with the porting part 212b of the cartridge, the protruding member 231b of the packing part, and the lower body member 231aa of the packing part. As illustrated in FIGS. 9A and 9B, the protruding member 231b may include at least two protruding members, and the sealing part 233 is formed between the at least two protruding members 231b.

Figure 10:
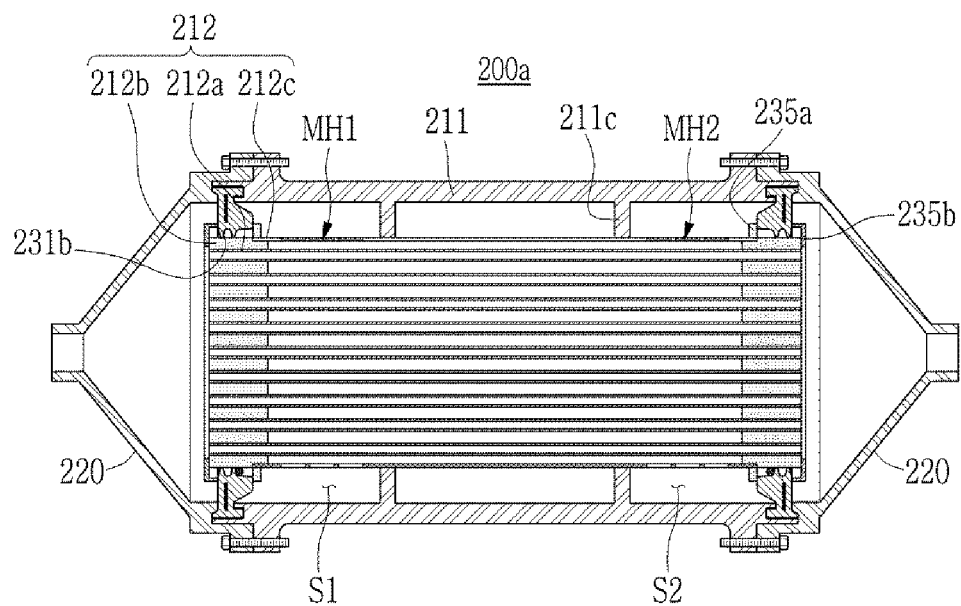
FIG. 10 is a cross-sectional view illustrating the second embodiment of the fuel cell humidifier comprising the gasket assembly according to the embodiments of the present disclosure.
Figure 11:
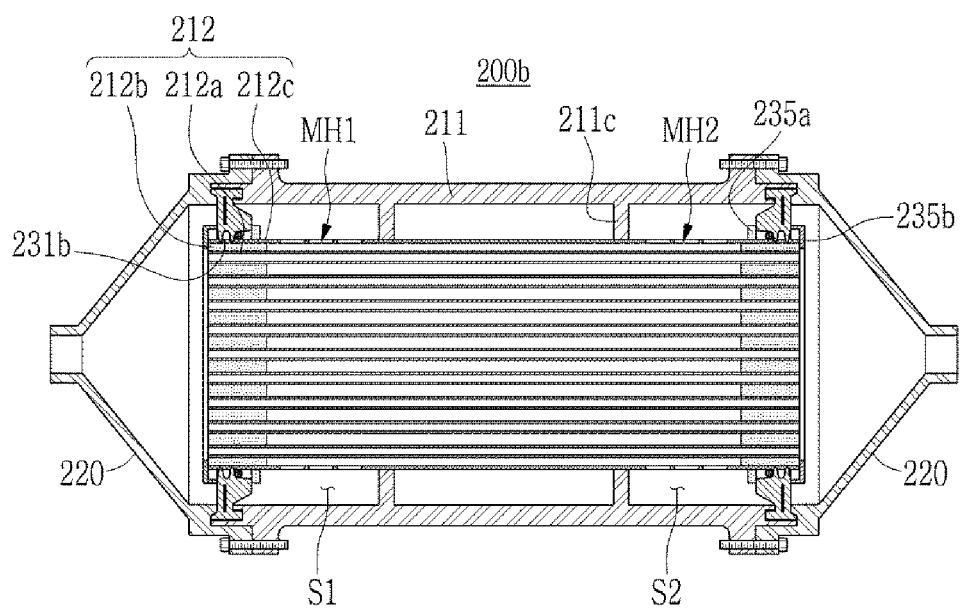
FIG. 11 is a cross-sectional view illustrating the third embodiment of the fuel cell humidifier comprising the gasket assembly according to the embodiments of the present disclosure.

Next, the second and third embodiments of the fuel cell humidifier comprising the gasket assembly according to the embodiments of the present disclosure will be described with reference to FIGS. 10 and 11. FIG. 10 is a cross-sectional view illustrating the second embodiment of the fuel cell humidifier comprising the gasket assembly according to the embodiments of the present disclosure, and FIG. 11 is a cross-sectional view illustrating the third embodiment of the fuel cell humidifier comprising the gasket assembly according to the embodiments of the present disclosure.

As illustrated in FIG. 10, in the fuel cell humidifier 200a according to the second embodiment of the present disclosure, (i) the inner space of the mid-casing 211 is divided into a first space S1 and a second space S2 by partitions 211c, and (ii) the cartridge 212 further includes an inner casing 212c. Except for the above-mentioned characteristics, the fuel cell humidifier 200a is substantially the same as the fuel cell humidifier 200 according to the first embodiment described above.

The inner casing 212c has an opening formed in each end thereof and the hollow fiber membranes 212a are located inside the inner casing 212c. The porting part 212b to which the end parts of the hollow fiber membranes 212a are fastened closes the opening of the inner casing 212c.

As illustrated in FIG. 10, at least a portion of the porting part 212b may be located outside the inner casing 212c, and the protruding member 231b of the gasket assembly 230 may be in close contact with the porting part 212b. The damping part 235a may be formed as an annular ring having a predetermined length on the outer peripheral surface of the inner casing 212c.

The inner casing 212c is provided with multiple holes MH1 arranged in a mesh form for fluid communication with the first space S1 (hereinafter, "first mesh holes"), and multiple holes MH2 (hereinafter, "second mesh holes") arranged in a mesh form for fluid communication with the second space S2.

Off-gas introduced through the off-gas inlet 211a into the first space S1 of the mid-casing 211 flows through the first mesh holes MH1 into the inner casing 212c and contacts with the outer surfaces of the hollow fiber membranes 212a. Next, off-gas deprived of moisture flows out to the second space S2 through the second mesh holes and then is discharged from the mid-casing 211 through the off-gas outlet 211b.

The cartridge 212 including such an inner casing 212c can be easily assembled with the mid-casing 211 and can be easily replaced.

As illustrated in FIG. 11, the fuel cell humidifier 200b according to the third embodiment of the present disclosure has the entirety of the porting part 212b located inside the inner casing 212c, and is substantially the same as the fuel cell humidifier 200a according to the second embodiment described above, except that the fuel cell humidifier 200b has the protruding member 231b of the gasket assembly 230 in close contact with the inner casing 212c rather than the porting part 212b.

Figure 12:
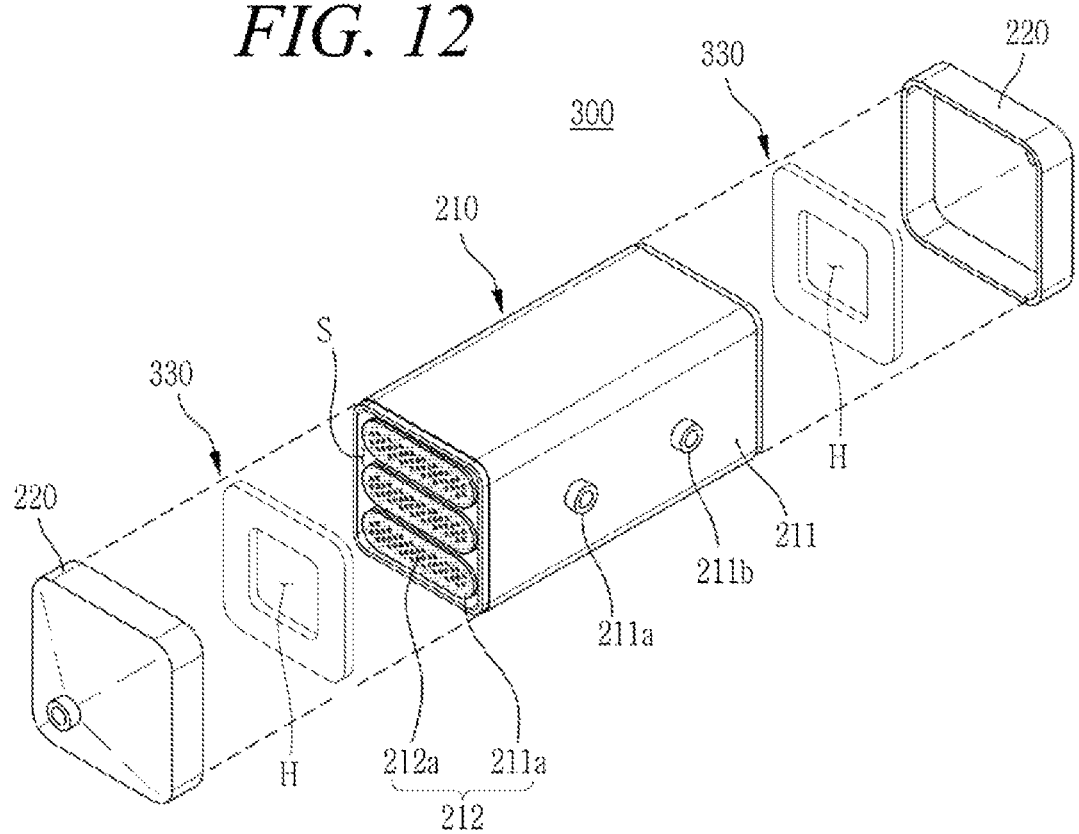
FIG. 12 is an exploded perspective view illustrating the fuel cell humidifier comprising the gasket assembly according to a fourth embodiment of the present disclosure.

Next, a fuel cell humidifier comprising the gasket assembly according to a fourth embodiment of the present disclosure will be described with reference to FIGS. 12 to 14. FIG. 12 is an exploded perspective view illustrating the fuel cell humidifier comprising the gasket assembly according to the fourth embodiment of the present disclosure, FIG. 13 is an exploded cross-sectional view illustrating the fuel cell humidifier comprising the gasket assembly according to the fourth embodiment of the present disclosure, and FIG. 14 is a cross-sectional view illustrating the fuel cell humidifier comprising the gasket assembly according to the fourth embodiment of the present disclosure.

Figure 13:
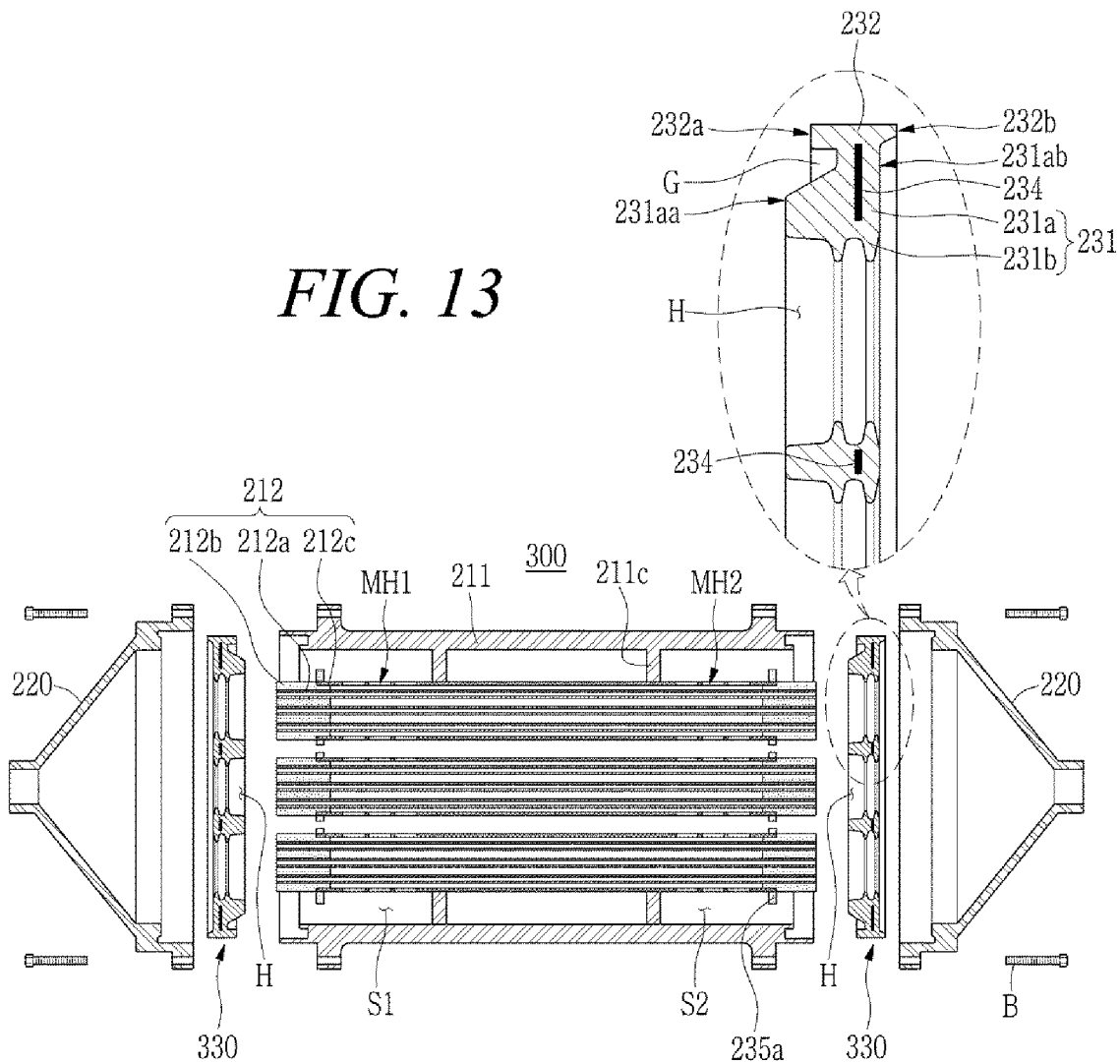
FIG. 13 is an exploded cross-sectional view illustrating the fuel cell humidifier comprising the gasket assembly according to the fourth embodiment of the present disclosure.
Figure 14:
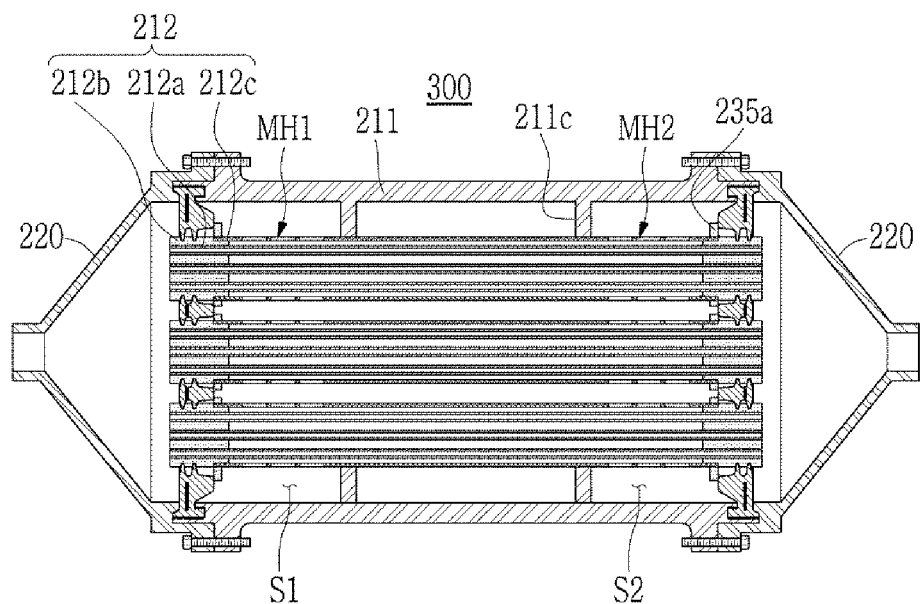
FIG. 14 is a cross-sectional view illustrating the fuel cell humidifier comprising the gasket assembly according to the fourth embodiment of the present disclosure.

As illustrated in FIGS. 12 to 14, in the fuel cell humidifier 300 having the gasket assembly 330 according to the fourth embodiment of the present disclosure, (i) the humidification module 210 includes at least two cartridges 212, (ii) the body member 231a of the packing part 231 is provided with at least two holes H into which the cartridges 212 are respectively inserted, (iii) at least two protruding members 231b are formed on the first end of the body member 231a so as to be in contact with the porting part 212b of the cartridge, and (iv) the damping part 235a is formed on each of the outer peripheral surfaces of the at least two cartridges. Except for the above described characteristics, the fuel cell humidifier 300 is substantially the same as the fuel cell humidifier 200a according to the second embodiment described above.

The plurality of cartridges 212 which respectively include the inner casings 212c are mounted at predetermined intervals inside the mid-casing 211, and accordingly, off-gas can be distributed evenly to all of the hollow fiber membranes 212a present in the mid-casing 211 and only a specific cartridge 212 that has a problem can be selectively replaced, so the maintenance costs of the fuel cell humidifier 300 can be further reduced.

Figure 15:
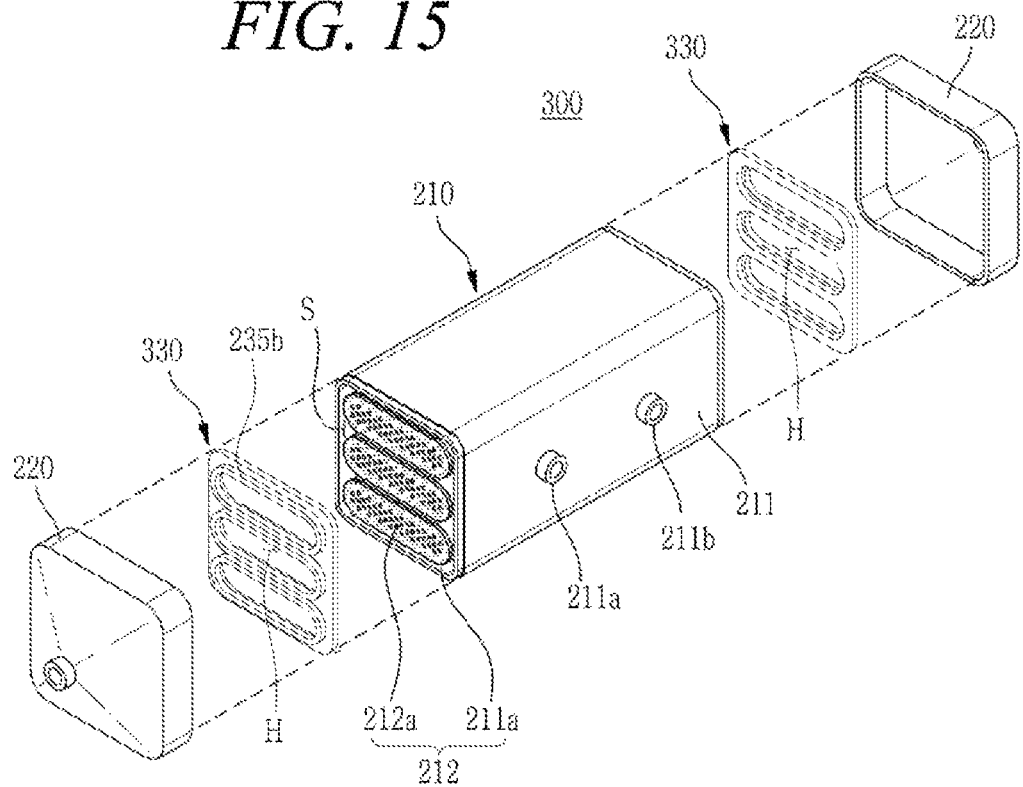
FIG. 15 is an exploded perspective view illustrating the fuel cell humidifier comprising the gasket assembly according to a fifth embodiment of the present disclosure.

Next, a fuel cell humidifier comprising the gasket assembly according to a fifth embodiment of the present disclosure will be described with reference to FIGS. 15 to 17. FIG. 15 is an exploded perspective view illustrating the fuel cell humidifier comprising the gasket assembly according to the fifth embodiment of the present disclosure, FIG. 16 is an exploded cross-sectional view illustrating the fuel cell humidifier comprising the gasket assembly according to the fifth embodiment of the present disclosure, and FIG. 17 is a cross-sectional view illustrating the fuel cell humidifier comprising the gasket assembly according to the fifth embodiment of the present disclosure.

Figure 16:
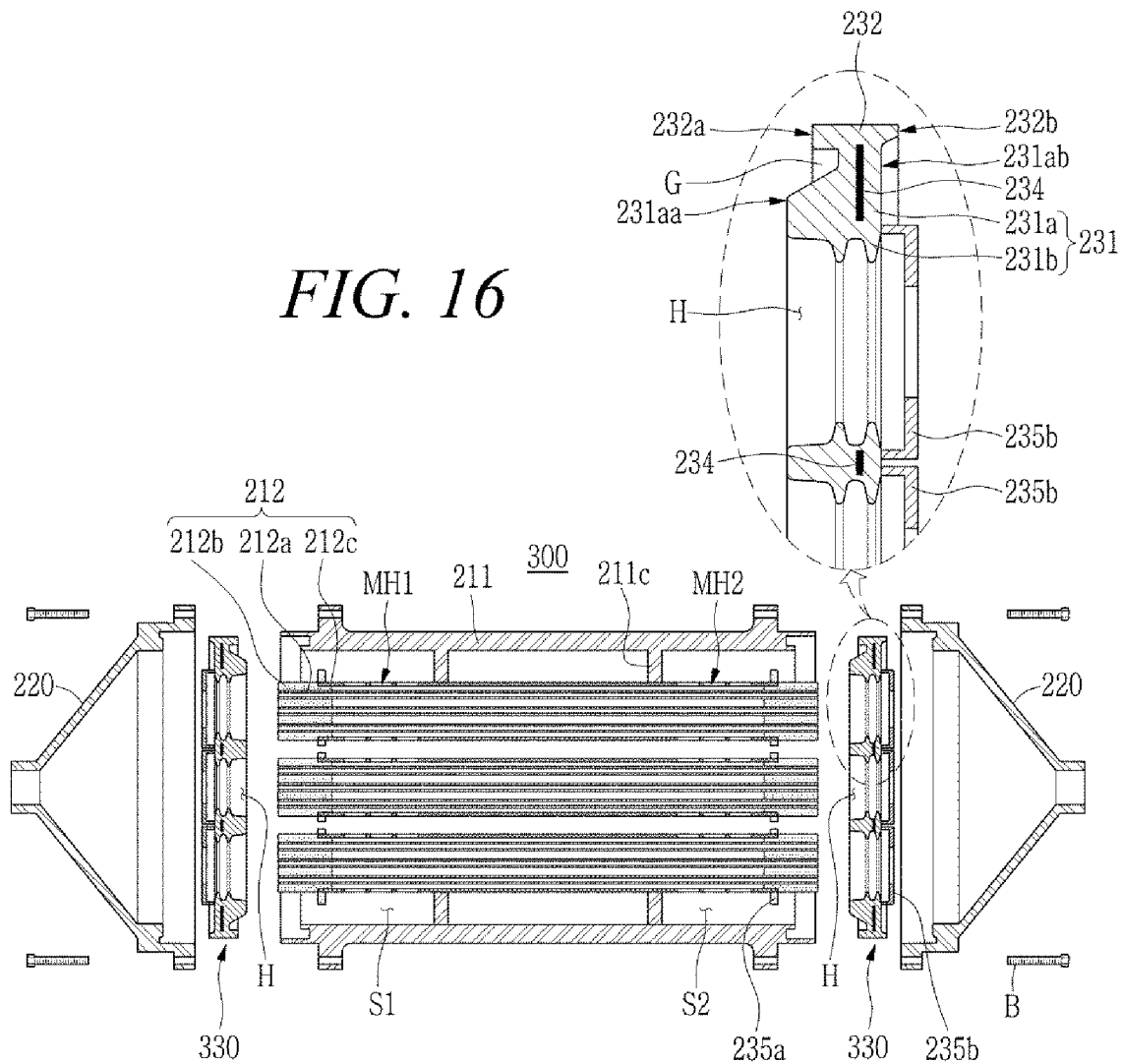
FIG. 16 is an exploded cross-sectional view illustrating the fuel cell humidifier comprising the gasket assembly according to the fifth embodiment of the present disclosure.
Figure 17:
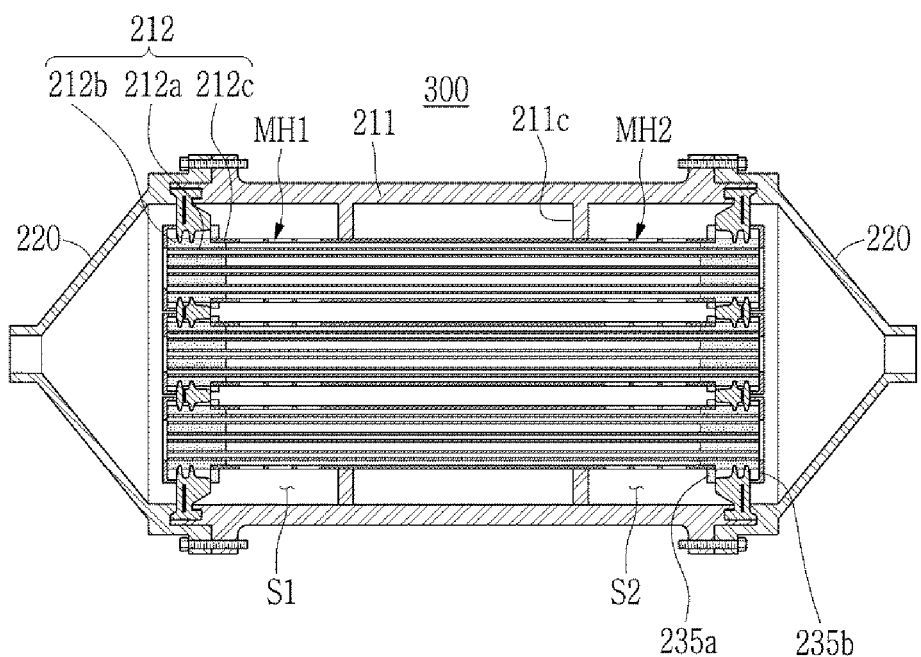
FIG. 17 is a cross-sectional view illustrating the fuel cell humidifier comprising the gasket assembly according to the fifth embodiment of the present disclosure.

As illustrated in FIGS. 15 to 17, the fuel cell humidifier 300 having the gasket assembly 330 according to the fifth embodiment of the present disclosure includes at least two damping cap parts 235b added to the gasket assembly 330 of FIGS. 12 to FIG. 14. Except for the above described characteristic, the fuel cell humidifier 300 is substantially the same as the fuel cell humidifier 300 according to the fourth embodiment described above. The damping cap part 235b may be formed on at least a portion of the upper surface of the packing part 231 and at least a portion of the upper surface of the porting part 212b of each of the cartridges 212.

Next, a sixth embodiment of the fuel cell humidifier comprising the gasket assembly according to the sixth embodiment of the present disclosure will be described with reference to FIGS. 18 and 19.

Figure 18:
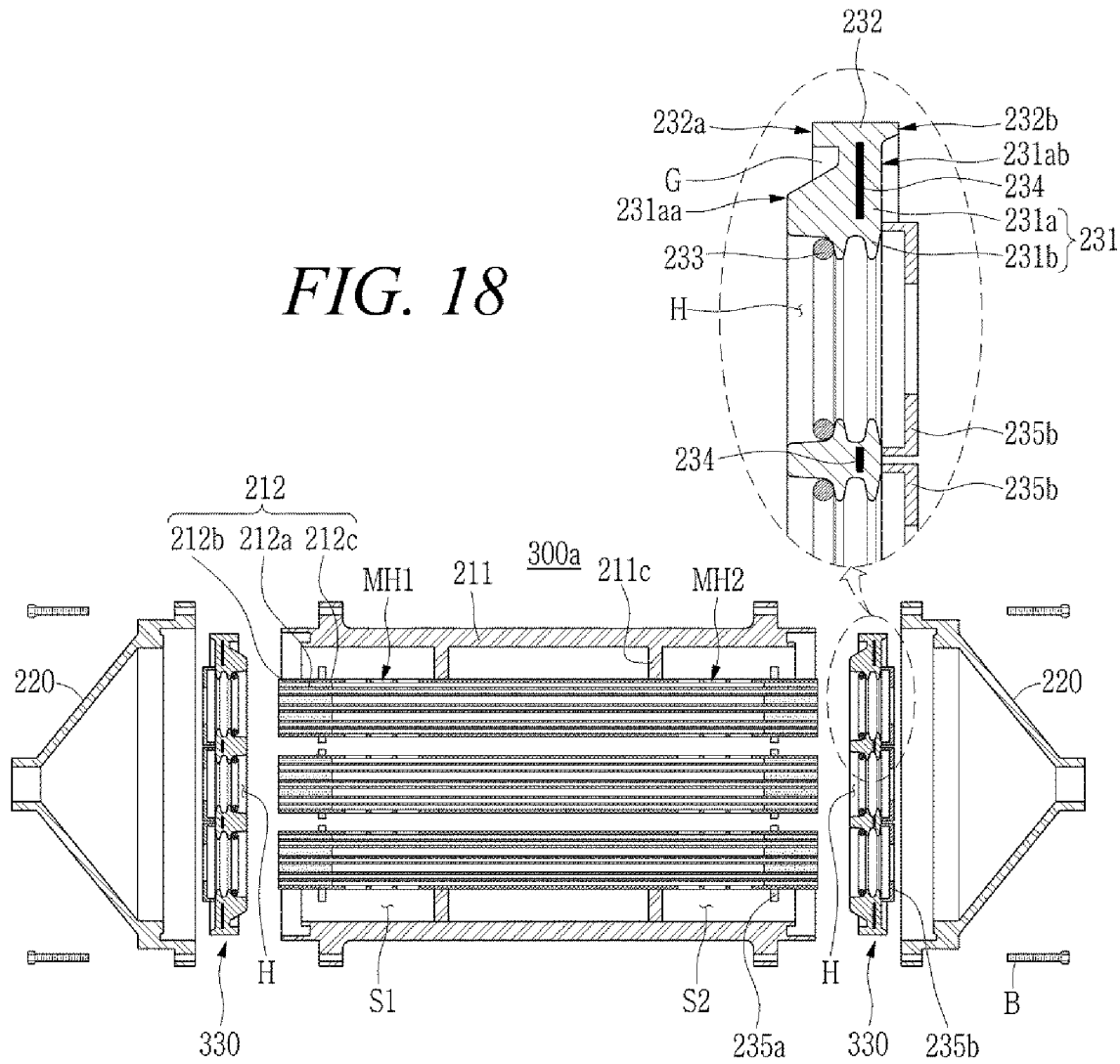
FIG. 18 is an exploded cross-sectional view illustrating the fuel cell humidifier comprising the gasket assembly according to a sixth embodiment of the present disclosure.
Figure 19:
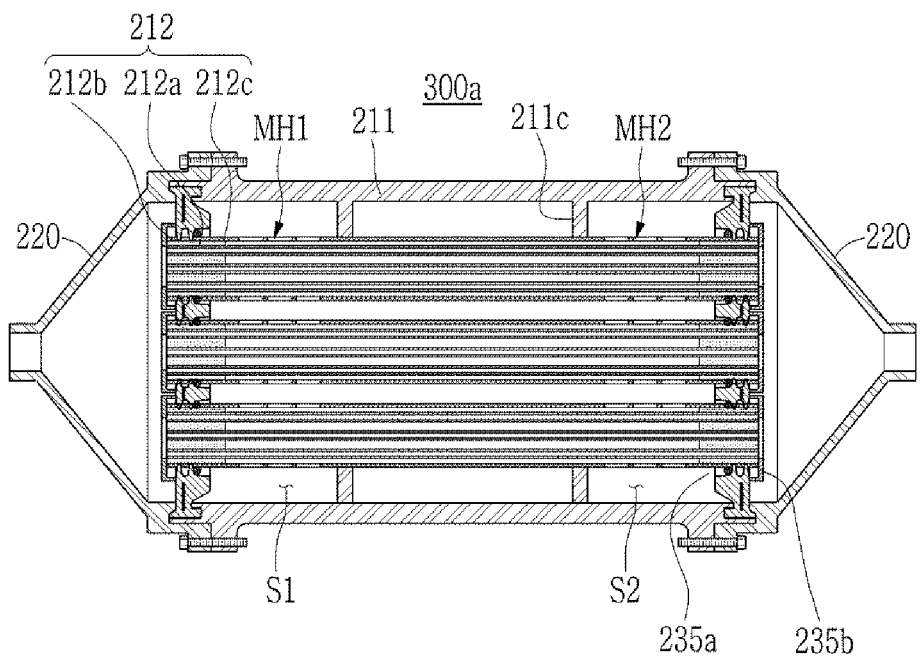
FIG. 19 is a cross-sectional view illustrating the fuel cell humidifier comprising the gasket assembly according to the sixth embodiment of the present disclosure.

As illustrated in FIGS. 18 and 19, a fuel cell humidifier 300a having the gasket assembly 330 according to the sixth embodiment of the present disclosure includes at least two sealing parts 233 added to the gasket assembly 330 of FIGS. 12 to FIG. 14 such that the at least two sealing parts 233 are located between the cartridge 212 and the packing part 231 so as to be in contact with the cartridge 212 and the packing part 231. Except for the above described characteristic, the fuel cell humidifier 300a is substantially the same as the fuel cell humidifier 300 according to the fourth embodiment described above.

The sealing part 233 is configured to be in contact with the cartridge 212 and the packing part 231 at the same time, and thus due to adhesive force of the sealing part 233, the horizontal vibration of the cartridge 212 can be additionally absorbed, so the horizontal vibration of the cartridge 212 can be effectively reduced.

In the above, although the embodiments of the present disclosure have been described, those skilled in the relevant technical field may variously modify and change the embodiments of the present disclosure by adding, changing, or deleting components without departing from the spirit of the present disclosure described in the claims, and these modified and changed embodiments are included in the scope of the claims of the present disclosure.

<Description of the Reference Numerals in the Drawings>

200, 200a, 200b, 300, 300a: Fuel cell humidifier
210: Humidification module
211: Mid-casing
211a: Off-gas inlet
211b: Off-gas outlet
211c: Partition
212: Cartridge -continued <Description of the Reference Numerals in the Drawings>

212a: Hollow fiber membrane
212b: Porting part
212c: Inner casing
220: Cap
230, 330: Gasket assembly
231: Packing part
231a: Body member
231b: Protruding member
232: Edge part
233: Sealing part
234: Reinforcing member
235a: Damping part
235b: Damping cap part

The invention claimed is:

1. A gasket assembly for a fuel cell humidifier comprising a mid-casing, a cap fastened to the mid-casing, and at least one cartridge disposed in the mid-casing and receiving a plurality of hollow fiber membranes, the gasket assembly comprising:
a packing part provided with a hole into which an end part of the cartridge is inserted, the packing part being in contact with the end part of the cartridge inserted into the hole so as to absorb horizontal vibration of the cartridge;
an edge part formed by being connected to the packing part, the edge part being inserted into a groove formed in an end part of the mid-casing and into space defined by an end part of the cap;
a damping part formed on an outer peripheral surface of the cartridge, the damping part being restrained from moving in a vertical direction by the packing part so as to absorb vertical vibration of the cartridge,
wherein the packing part is provided with at least two holes into which at least two cartridges are respectively capable of being inserted, and the damping part is formed on an outer peripheral surface of each of the at least two cartridges and is restrained from moving in the vertical direction by the packing part so as to absorb vertical vibration of the cartridge.

2. The gasket assembly of claim 1, wherein the packing part comprises a body member having the hole into which the end part of the cartridge is inserted, and a protruding member formed on an end of the body member and configured to be in contact with the end part of the cartridge inserted into the hole.

3. The gasket assembly of claim 2, wherein the cartridge comprises an inner casing having an opening formed in an end part thereof and receiving the plurality of hollow fiber membranes, and a porting part to which end parts of the plurality of hollow fiber membranes are fastened, the porting part being configured to close the opening of the inner casing.

4. The gasket assembly of claim 3, wherein at least a portion of the porting part is located outside the inner casing, and the protruding member presses the porting part to be in contact with the porting part.

5. The gasket assembly of claim 3, wherein an entirety of the porting part is located inside the inner casing, and the protruding member presses the inner casing to be in contact with the inner casing.

6. The gasket assembly of claim 1, further comprising:
a sealing part configured to allow the cartridge to be in contact with the packing part, wherein the horizontal and vertical vibrations of the cartridge are absorbed due to adhesive force of the sealing part.

7. The gasket assembly of claim 1, further comprising:
a damping cap part formed on at least a portion of an upper surface of the packing part and on at least a portion of an upper surface of the cartridge, the damping cap part being configured to absorb the vertical vibration of the cartridge.

8. The gasket assembly of claim 1, wherein the edge part is provided with an edge wing protruding in each of opposite directions thereof, wherein the edge wing is inserted into the groove formed in the end part of the mid-casing while filling the groove, so an inside and outside of the mid-casing are blocked from each other, and the mid-casing and the cap are sealed.

9. The gasket assembly of claim 1, wherein each of the packing part and the edge part has a first hardness of 20 to 70 Shore A, and further comprises a reinforcement member formed by being inserted into at least a portion of each of the packing part and the edge part, the reinforcement member having a second hardness higher than the first hardness.

10. A fuel cell humidifier comprising:
a mid-casing;
a cap fastened to the mid-casing;
at least one cartridge disposed in the mid-casing and receiving a plurality of hollow fiber membranes; and
a gasket assembly coupled securely to at least an end of a humidification module through mechanical assembly such that the cap is in fluid communication only with the hollow fiber membranes, the gasket assembly being configured to absorb vibration of the cartridge,
wherein the gasket assembly comprises:
a packing part provided with a hole into which an end part of the cartridge is inserted, the packing part being in contact with the end part of the cartridge inserted into the hole so as to absorb horizontal vibration of the cartridge;
an edge part formed by being connected to the packing part, the edge part being inserted into a groove formed in an end part of the mid-casing and into space defined by an end part of the cap;
a damping part formed on an outer peripheral surface of the cartridge, the damping part being restrained from moving in a vertical direction by the packing part so as to absorb vertical vibration of the cartridge,
wherein the packing part is provided with at least two holes into which at least two cartridges are respectively capable of being inserted, and the damping part is formed on an outer peripheral surface of each of the at least two cartridges and is restrained from moving in the vertical direction by the packing part so as to absorb vertical vibration of the cartridge.

11. The fuel cell humidifier of claim 10, wherein the packing part comprises a body member having the hole into which the end part of the cartridge is inserted, and a protruding member formed on an end of the body member and configured to be in contact with the end part of the cartridge inserted into the hole.

12. The fuel cell humidifier of claim 11, wherein the cartridge comprises an inner casing having an opening formed in an end part thereof and receiving the plurality of hollow fiber membranes, and a porting part to which end parts of the plurality of hollow fiber membranes are fastened, the porting part being configured to close the opening of the inner casing.

13. The fuel cell humidifier of claim 12, wherein at least a portion of the porting part is located outside the inner casing, and the protruding member presses the porting part to be in contact with the porting part.

14. The fuel cell humidifier of claim 12, wherein an entirety of the porting part is located inside the inner casing, and the protruding member presses the inner casing to be in contact with the inner casing.

15. The fuel cell humidifier of claim 10, further comprising:
- a sealing part configured to allow the cartridge to be in contact with the packing part, wherein the horizontal and vertical vibrations of the cartridge are absorbed due to adhesive force of the sealing part.

16. The fuel cell humidifier of claim 10, further comprising:
- a damping cap part formed on at least a portion of an upper surface of the packing part and on at least a portion of an upper surface of the cartridge, the damping cap part being configured to absorb the vertical vibration of the cartridge.

17. The fuel cell humidifier of claim 10, wherein the edge part is provided with an edge wing protruding in each of opposite directions thereof, wherein the edge wing is inserted into the groove formed in the end part of the mid-casing while filling the groove, so an inside and outside of the mid-casing are blocked from each other, and the mid-casing and the cap are sealed.

18. The fuel cell humidifier of claim 10, wherein each of the packing part and the edge part has a first hardness of 20 to 70 Shore A, and further comprises a reinforcement member formed by being inserted into at least a portion of each of the packing part and the edge part, the reinforcement member having a second hardness higher than the first hardness.

\* \* \* \* \*